(12) United States Patent
Burns et al.

(10) Patent No.: US 11,802,803 B2
(45) Date of Patent: Oct. 31, 2023

(54) INTERNAL FORCE TRANSDUCER BALANCE SYSTEM FOR MEASURING AERODYNAMIC INTERFERENCE FORCES

(71) Applicant: UNITED STATES OF AMERICA AS REPRESENTED BY THE ADMINISTRATOR OF NASA, Washington, DC (US)

(72) Inventors: Devin E. Burns, Yorktown, VA (US); Peter A. Parker, Yorktown, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 59 days.

(21) Appl. No.: 17/461,107

(22) Filed: Aug. 30, 2021

(65) Prior Publication Data

US 2022/0221360 A1 Jul. 14, 2022

Related U.S. Application Data

(60) Provisional application No. 63/071,719, filed on Aug. 28, 2020.

(51) Int. Cl.
*G01L 19/00* (2006.01)
*G01L 9/00* (2006.01)
*G01L 1/26* (2006.01)

(52) U.S. Cl.
CPC .......... *G01L 19/0023* (2013.01); *G01L 1/26* (2013.01); *G01L 9/006* (2013.01)

(58) Field of Classification Search
None
See application file for complete search history.

(56) References Cited

U.S. PATENT DOCUMENTS

| | | | | |
|---|---|---|---|---|
| 5,056,361 A | * | 10/1991 | Roberts | G01L 5/1627 73/147 |
| 9,052,250 B1 | * | 6/2015 | Parker | G01L 25/00 |
| 2002/0088268 A1 | * | 7/2002 | Parker | G01G 23/01 73/1.15 |

* cited by examiner

*Primary Examiner* — Brandi N Hopkins
*Assistant Examiner* — Nigel H Plumb
(74) *Attorney, Agent, or Firm* — Shawn P. Gorman; Robin W. Edwards; Trenton J. Roche (57) ABSTRACT

There is a need to develop new internal balance structures that allow for measurements of aerodynamic interference forces (e.g., powered descent forces) in addition to aerodynamic loads. For example, supersonic retropropulsion (SRP) is a technique involving thrusters in opposition to the oncoming airflow to decelerate an aircraft vehicle while traveling at supersonic speeds. SRP has been identified as a key entry, descent, and landing technology for future Mars missions and for reuse of rocket boosters on Earth. Because of the propellant and oxidizer mass required for the thrusters, currently proposed SRP configurations require a significant increase in performance and efficiency before considered an effective solution. The challenge is that this procedure may cause the air around the spacecraft to become unstable. Accordingly, the present disclosure describes systems and methods for measuring aerodynamic interference forces in addition to aerodynamic loads using an improved internal force balance or integral flow-through force transducer.

20 Claims, 8 Drawing Sheets

INTERNAL FORCE TRANSDUCER BALANCE SYSTEM FOR MEASURING AERODYNAMIC INTERFERENCE FORCES

CROSS-REFERENCE TO RELATED PATENT APPLICATION

This patent application claims the benefit of and priority to U.S. provisional application entitled, "Integral Flow-Through Force Transducer," having Ser. No. 63/071,719, filed Aug. 28, 2020, the contents of which are hereby incorporated by reference in their entirety for any and all non-limiting purposes.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND

Wind-tunnel balances are multi-dimensional force transducers used to obtain high-precision measurements of the aerodynamic loads on a test model during wind-tunnel testing. In many wind tunnels, aerodynamic measurements are made with the wind-tunnel balance installed inside of the test model, also known as an internal balance. Internal balances are electro-mechanical devices designed to isolate the aerodynamic load components on to a series of flexural elements.

However, with the advent of new aircraft concepts, such as utilizing power descent to land a large aircraft vehicle, there is a need to develop internal balance structures that allow for measurements of aerodynamic interference forces (e.g., powered descent forces).

BRIEF SUMMARY

Aspects are directed to various embodiments of an internal force transducer balance system and related methods. Accordingly, the present disclosure describes systems and methods for measuring aerodynamic interference forces in addition to aerodynamic loads using an improved internal force balance or integral flow-through force transducer.

One embodiment of the invention is an internal force transducer balance system that includes an internal balance having a balance body extending axially along a longitudinal direction, such that the balance body has a metric interface portion at a first end and a non-metric interface portion at a second end of the balance body. The balance body further includes an axial strain measurement component of the balance body, wherein the axial strain measurement component is configured to measure an axial force applied to the internal balance. The system further includes an integral fluid flow path that continuously extends from the first end to the second end of the balance body, wherein the integral fluid flow path is positioned in an interior core of the balance body and is routed through the axial strain measurement component of the internal balance. The integral fluid flow path also comprises one or more turns as the integral fluid flow path is routed through the axial strain measurement component of the internal balance.

Another embodiment of the invention is an internal balance measurement method. The method includes providing an internal balance having a balance body extending axially along a longitudinal direction, where the balance body has a metric interface portion at a first end and a non-metric interface portion at a second end of the balance body. The balance body further comprises an axial strain measurement component of the balance body, wherein the axial strain measurement component is configured to measure an axial force applied to the internal balance. The balance body further comprises an integral fluid flow path that continuously extends from the first end to the second end of the balance body, wherein the integral fluid flow path is positioned in an interior core of the balance body and is routed through the axial strain measurement component of the internal balance, such that the integral fluid flow path comprises one or more turns as the integral fluid flow path is routed through the axial strain measurement component of the internal balance. Respectively, the method further includes connecting the metric interface portion of the internal balance to a test model, wherein the integral fluid flow path of the internal balance is coupled to an internal fluid flow path of the test model; connecting the non-metric interface portion of the internal balance to a sting element of testing equipment, wherein the integral fluid flow path of the internal balance is coupled to an internal fluid flow path of the sting element; and applying air flow over the test model while a fluid is applied to the integral fluid flow path via the sting element. Thus, the method can measure, via the axial strain measurement component, an axial force applied to the internal balance by the air flow over the test model and the fluid applied to the integral fluid flow path.

These and/or other features, advantages, and objects of the present invention will be further understood and appreciated by those skilled in the art by reference to the following specification, claims, and appended drawings.

DETAILED DESCRIPTION OF THE INVENTION

Figure 1A:
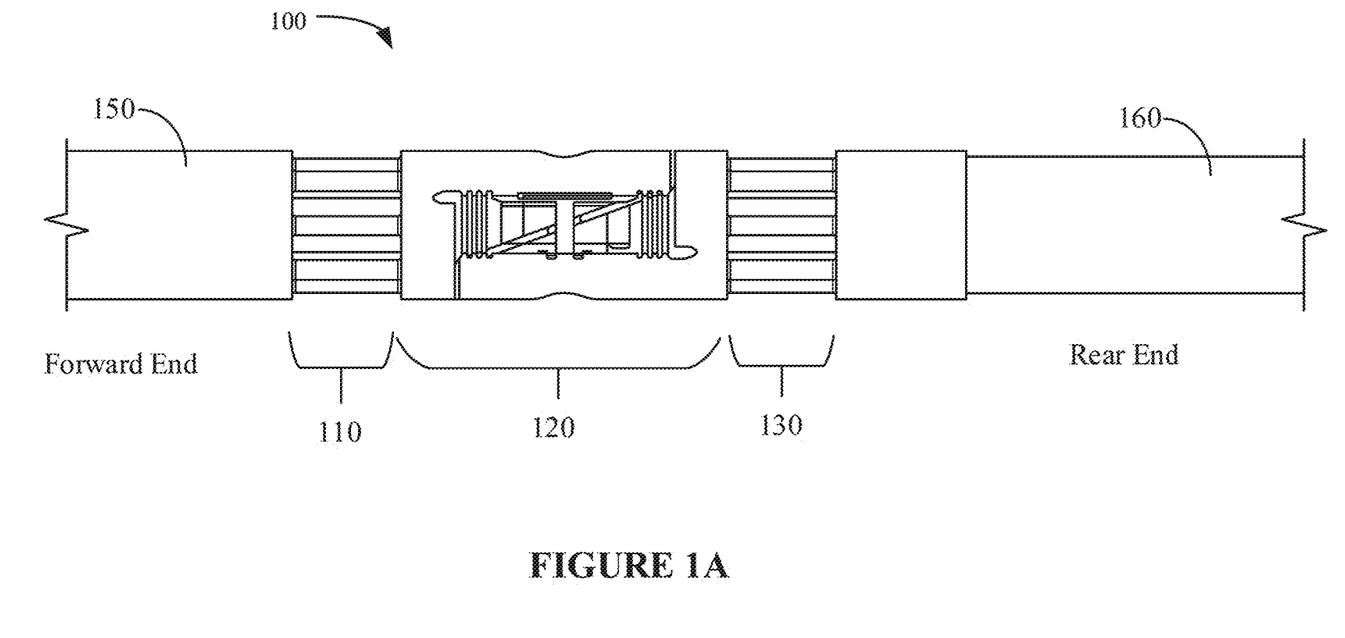
FIG. 1A is a side view of an integral flow-through force transducer in accordance with embodiments of the present disclosure.

For purposes of description herein, the terms "upper," "lower," "right," "left," "rear," "front," "forward," "aft," "vertical," "horizontal," and derivatives thereof shall relate to the invention as oriented in FIG. 1A. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1A is an external side view of an improved internal balance structure 100, also referred to as integral flow-through force transducer, in accordance with embodiments of the present disclosure. With the advent of new aircraft concepts, there is a need to develop new internal balance structures that allow for measurements of aerodynamic interference forces (e.g., powered descent forces) in addition to aerodynamic loads. For example, supersonic retropropulsion (SRP) is a technique that involves using thrusters directed in opposition to the oncoming airflow to decelerate an aircraft vehicle while traveling at supersonic speeds. SRP has been identified as a key entry, descent, and landing technology for future Mars missions and for the reuse of rocket boosters on Earth. Because of the propellant and oxidizer mass required for the thrusters, currently proposed SRP configurations require a significant increase in performance and efficiency before they can be considered an effective solution for certain air or space travels. The challenge is that this procedure may cause the air around the spacecraft to become unstable. Accordingly, the present disclosure describes systems and methods for measuring aerodynamic interference forces in addition to aerodynamic loads using an improved internal force balance or integral flow-through force transducer.

As shown in FIG. 1A, the internal force transducer balance system 100 comprises a cylindrical body instrumented with strain measurement components 110, 120, 130 for measuring aerodynamic loads comprising three orthogonal components of aerodynamic force (normal, axial, and side force) and three orthogonal components of aerodynamic moment/torque (rolling, pitching, and yawing moments) by monitoring structural deformations with strain gages. Accordingly, the internal force transducer balance system 100 can be accurately characterized as a six component balance.

The strain measurement components 110, 120, 130 are configured to relate or convert an applied load to a voltage signal. In general, the strain measurement components of an exemplary integral flow-through force transducer 100 are equipped with flexures that deflect when a load is applied. These flexures are designed to respond to load in a particular axis. Thus, the integral flow-through force transducer 100 can have individual flexures that each measure load in one axis, and strain gages are bonded to these flexures to measure the deflections due to applied loads. In various embodiments, the strain gages are electrically interconnected in combinations that form bridge circuits for determining the six components of aerodynamic loads on the test model (e.g., aircraft model). For example, individual strain gages can be wired in a wheatstone bridge so that small resistance changes within the strain gages (in response to an applied strain) can be measured as voltage signals.

Figure 1B:
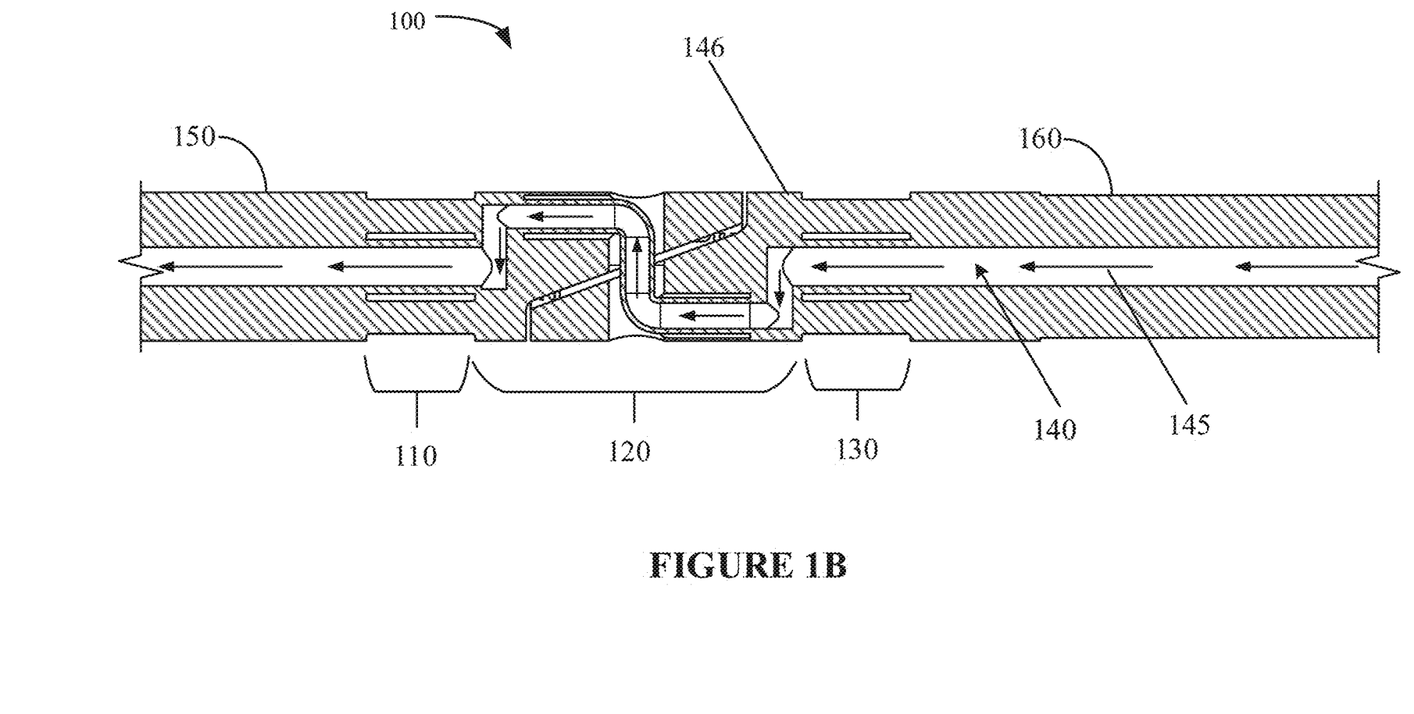
FIG. 1B is a cross sectional view of the integral flow-through force transducer of FIG. 1A.
Figure 4A:
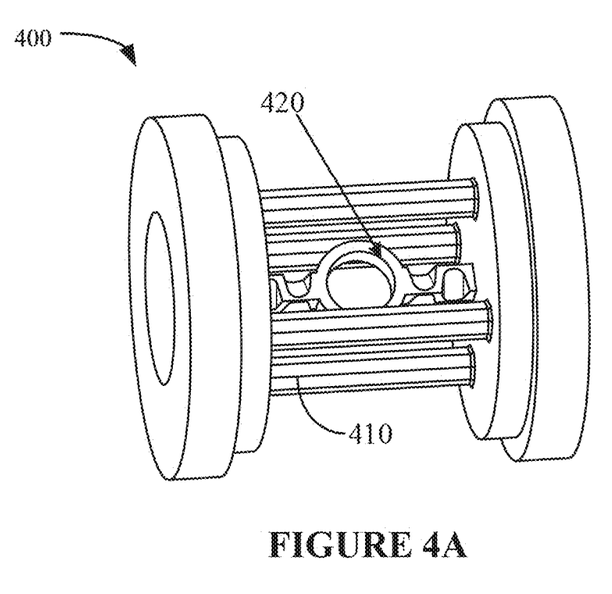
FIG. 4A is a side view of a bend component of structural tubes and flexure membranes that may be utilized in the forward and rear portions of an integral flow-through force transducer in accordance with embodiments of the present disclosure.
Figure 4B:
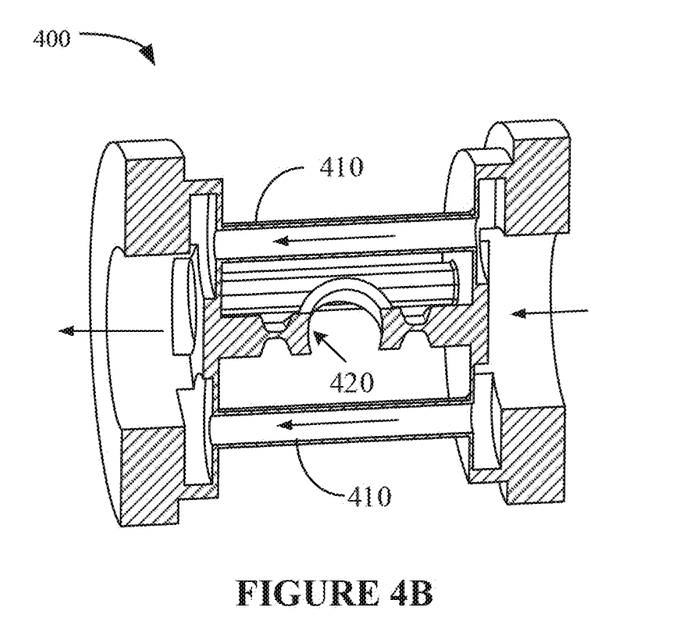
FIG. 4B is a cross sectional view of the bend component of FIG. 4A.

The strain measurement components include a component 110 positioned at or near a front or forward end of the internal balance 100 and a component 130 positioned at or near an aft or rear end of the internal balance 100. The forward strain measurement component 110 is adjacent in position to a metric interface portion 150 of the internal balance that is used to mount or connect the internal balance to the test model, where the test model may be a variety of types of aircraft, space, or non-flight vehicles or objects that may include fixed wing aircraft, rotary wing aircraft, missile, rocket, planetary entry vehicle, landing vehicles, etc. Correspondingly, the rear strain measurement component 130 is adjacent in position to a non-metric interface portion 160 that is used to mount or connect the internal balance to a sting element of a wind tunnel testing equipment. Each of the forward and rear strain measurement components measure forces and moments that act in a orthogonal direction relative to the longitudinal axis of the test model. For the measurement of the axial force that acts in an axially aft direction along the longitudinal axis, the strain measurement components further include an axial strain measurement component 120 that comprises flexures and a bending beam to detect the axial force and is positioned between the forward and rear strain measurement components 110, 130. Thus, an exemplary integral flow-through transducer 100 allows for direct measurement of aerodynamic interference forces In addition to allowing for direct measurement of aerodynamic forces and moments, the internal force transducer balance system 100 allows for direct measurement of aerodynamic interference forces by providing a continuous integral fluid flow path or passage 145 (FIG. 1B) through an interior core 140 of a balance body 146 of the internal force transducer balance system 100 (internal balance) that does not deteriorate measurement accuracy by introducing parasitic load paths. Accordingly, the internal force transducer balance system 100 provides an internal passageway 145 in fluidic communication from one (rear or aft) end (also referred to as non-metric end) 160 of the device to an opposite (forward or metric) end 150. As such, the internal force transducer balance system 100 can be accurately characterized as a flow-through balance. In other words, in various embodiments, the internal force transducer balance system 100 is a novel six component flow-through wind tunnel balance that allows for direct measurement of aerodynamic interference forces in addition to aerodynamic forces and moments/torques. As such, an exemplary internal force transducer balance system 100 provides the ability to flow or store fluid or gas through the structural components of the force transducer 100. Accordingly, FIG. 1B shows an internal cross sectional view of the internal force transducer balance system 100 of FIG. 1A. In FIG. 1B, the integral fluid flow path 145 is oriented in a longitudinal direction to form a longitudinal fluid flow path that is parallel or substantially parallel to the longitudinal axis of the internal force transducer balance system 100 beginning at the rear or aft end 160 of the device and positioned in a central core of the internal force transducer balance system 100. Then, in proximity to a middle or central portion of the internal force transducer balance system 100, the fluid flow path changes direction (e.g., via an orthogonal turn, a non-orthogonal turn, etc.) to form a downward perpendicular flow path with respect to the longitudinal fluid flow path that resumes in a longitudinal direction (towards the opposing end) within a lower portion of the internal force transducer balance system 100. Near or at the center point of the balance longitudinally (which corresponds to a center of the axial strain measurement component 120, the fluid flow path 145 changes direction (e.g., via an orthogonal turn, a non-orthogonal turn, etc.) to form an upward perpendicular path that resumes in a longitudinal direction (towards the opposing end) within an upper portion of the internal force transducer balance system 100. Then, in proximity to an opposing middle portion edge of the internal force transducer balance system 100, the fluid flow path changes direction to form a downward perpendicular flow path with respect to the longitudinal fluid flow path that resumes in a longitudinal direction (towards the forward end 150) within a center core 140 of the internal force transducer balance system 100. Accordingly, in the figure, the flow of a fluid through the fluid flow path is illustrated by the sequence of arrows within the fluid flow path 145. In various embodiments, the integral flow flow path may have orthogonal turns, but the turns are not limited to being orthogonal and in certain cases, it is preferred that the turns are not orthogonal, as illustrated in FIG. 4B.

Figure 1C:
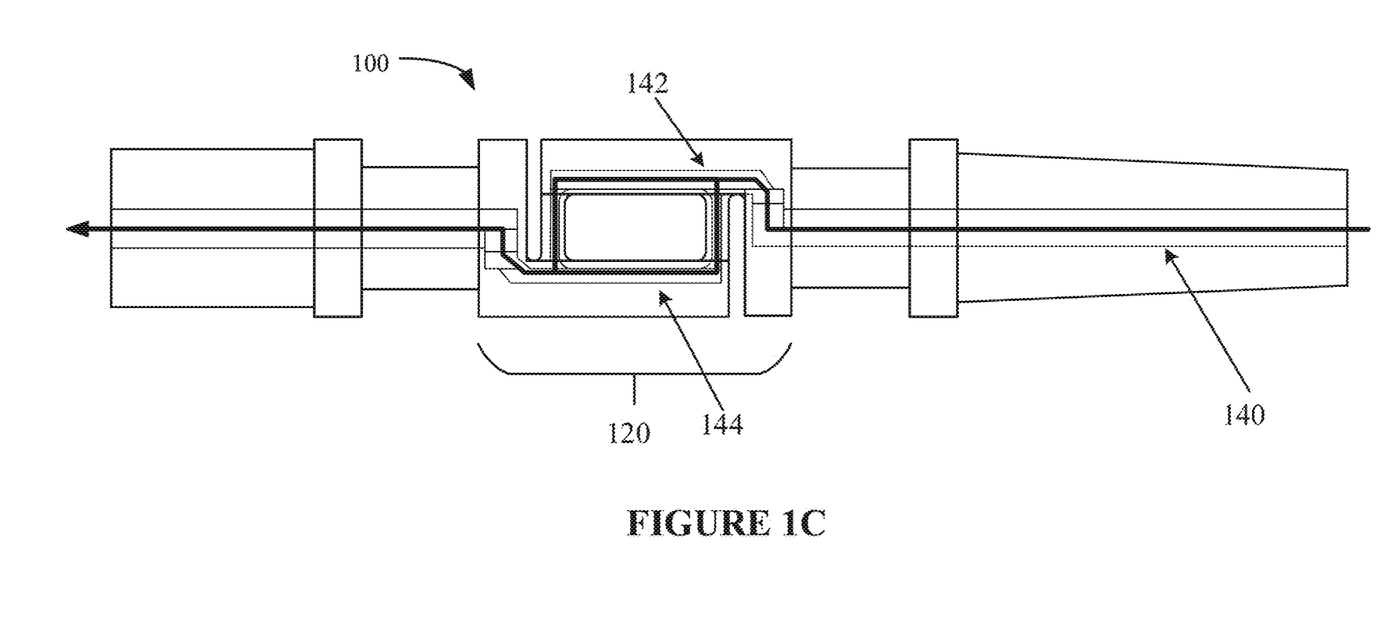
FIG. 1C is a diagram of an alternative embodiment of an integral flow-through force transducer in accordance with embodiments of the present disclosure.

In various embodiments, the fluid flow path 140 is not limited to the example provided in FIG. 1B. Other perpendicular shapes and/or orientations of the fluid flow path having orthogonal turns, etc. are utilized in alternative embodiments. To demonstrate one example implementation, FIG. 1C shows an alternative embodiment of the integral flow-through force transducer having a flow path 140 that branches from the longitudinal fluid flow path from the rear end of the balance to a top portion 142 and a bottom portion 144 that flow through the axial strain measurement component 120 of the balance 100 before resuming a longitudinal flow at a forward end of the balance, as demonstrated by fluid flow represented by the illustrative solid arrow through the central core of the integral flow-through force transducer in the figure. Accordingly, the fluid flow paths may have orthogonal turns as shown in FIG. 1B and FIG. 1C, but it is not required as shown in FIG. 4B. In accordance with the present disclosure, embodiments disclosed herein may feature an integral fluid flow path that is primarily axial in nature extending from the non-metric end to the metric end while simultaneously allowing for the measurement of axial force.

In accordance with certain embodiments of the present disclosure, a perpendicular fluid flow path acts to enable improve axial measurement sensitivity. As a non-limiting example, various square-wave shaped flow paths may be used in various embodiments. In accordance with various embodiments, an exemplary six-component integral flow-through force transducer or balance includes an axial strain measurement measuring component 120 and incorporates a fluid flow path 140 integral to the structure. As such, the fluid flow patch 140 that is positioned through or adjacent to the axial strain measurement instrumentation 120 while flowing internally through the internal balance 100 enables axial measurement of drag/axial aerodynamic forces, thus allowing for a six-component flow through design. The innovation includes mechanical analysis of the newly incorporated axial strain measurement component 120 to estimate a structural factor of safety and predict measurement performance.

Figure 2A:
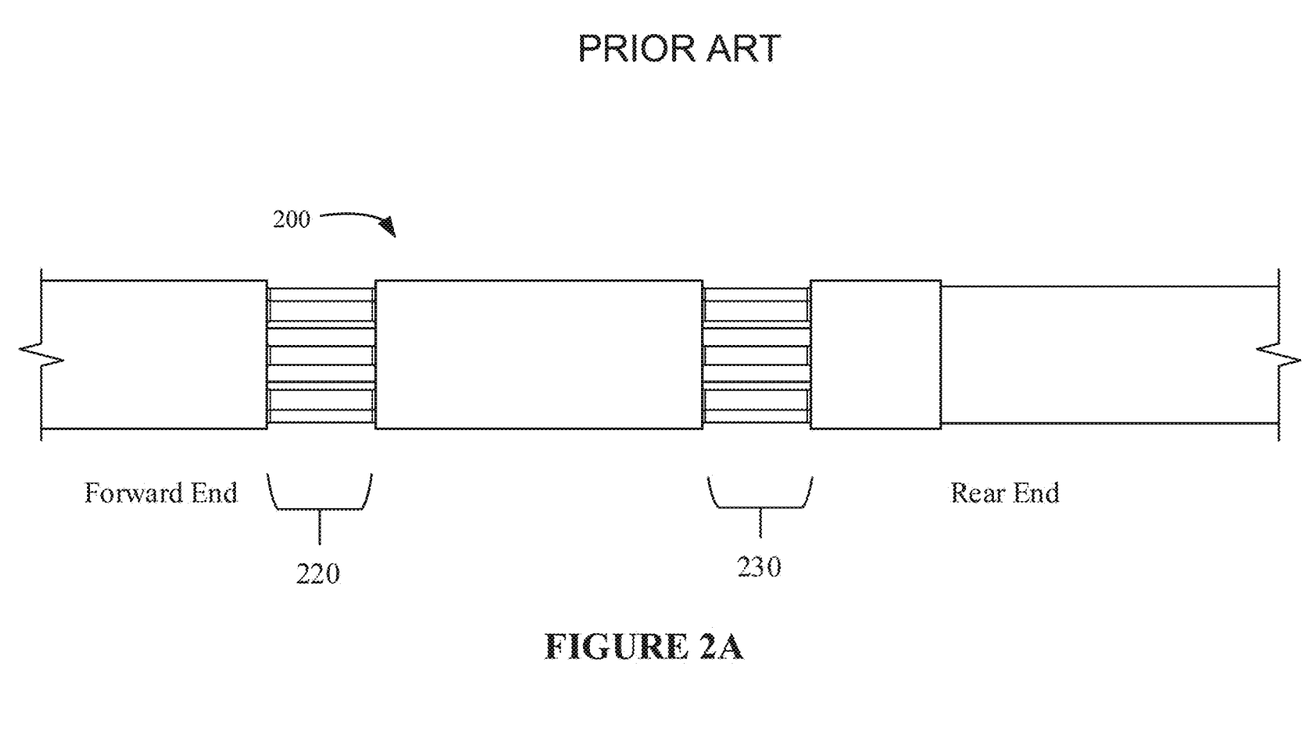
FIG. 2A is a side view of a conventional flow-through force transducer.
Figure 2B:
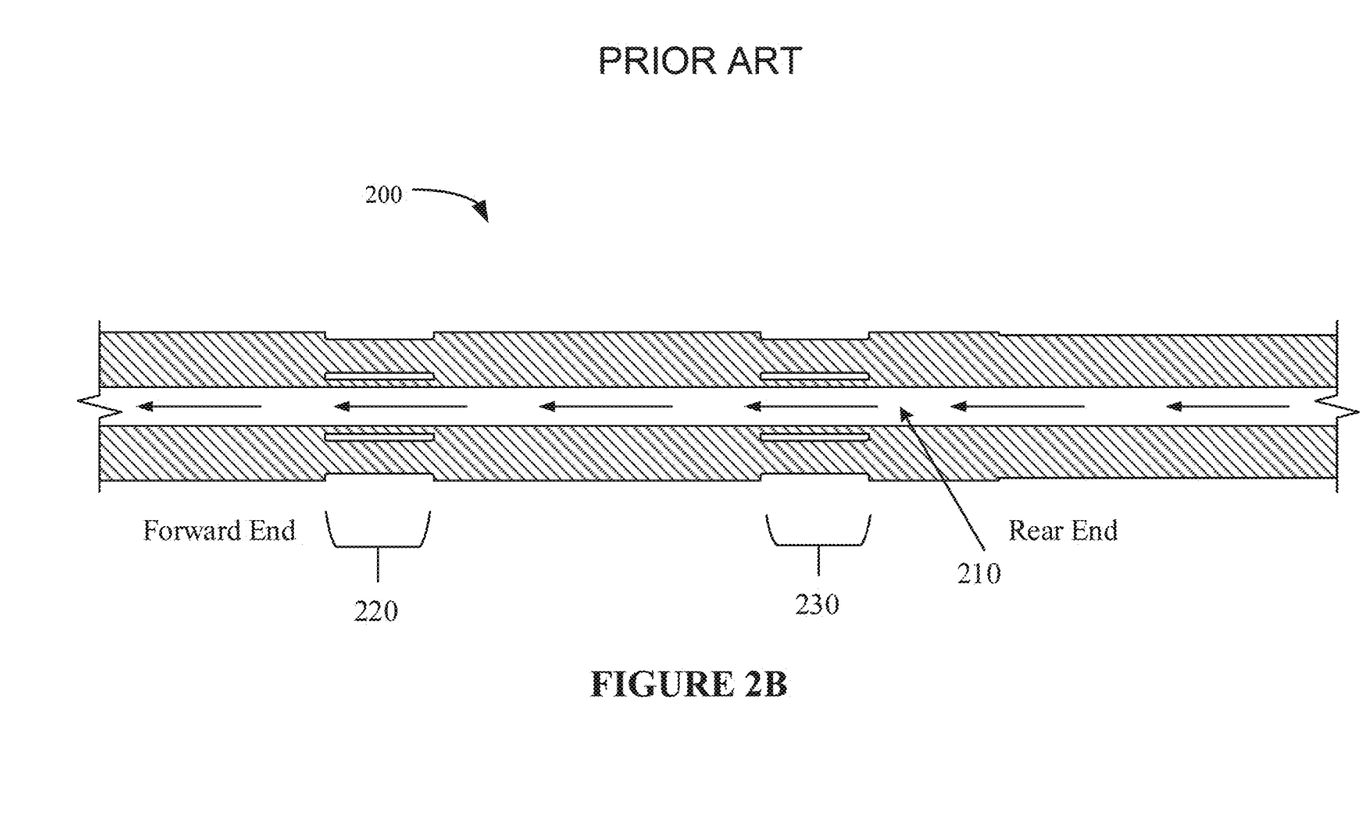
FIG. 2B is a cross sectional view of the conventional flow-through force transducer of FIG. 2A.

In contrast, FIG. 2A shows an exterior side view of a conventional flow-through balance device 200. Correspondingly, FIG. 2B shows an internal cross sectional view of the force transducer 200 of FIG. 2A. Here, the conventional balance device 200 features a fluid flow passage 210 that extends in one parallel or substantially parallel direction through the central core of the device from a forward end of the device to the rear end of the device. Accordingly, the flow of a fluid through the passage 210 is illustrated by the sequence of arrows within the fluid flow passage 210. The conventional flow-through device 200 includes forward and rear strain measuring components 220, 230 but does not include an axial strain measuring element. In turn, the prior art for integral flow through balances has been limited to five-component (normal, pitch, roll, yaw, and side) balances without the sixth component, axial force, which is the dominant component used to measure aircraft drag (for fuel efficiency purposes) and also provides important control information (such as how fast is the vehicle expected to deaccelerate). Adding the axial strain measuring element is critical to aeroscience researchers as it allows them to directly measure the drag force with the balance while simultaneously providing a fluid flow path for powered simulation, thermal conditioning, or variable stiffness. Further, as compared to the conventional design, the fluid flow path 140 of the integral flow-through force transducer 100 of FIGS. 1A-1B is more complicated in the six-component balance design and thus the innovation enables improved analysis and testing of fluid flow parameters. Under the current state-of-the art (flow-through balances without axial force), researchers are either required to infer the drag force (e.g., by integrating pressure taps on the test model, which increases axial force measurement uncertainty) or run a redundant, second wind tunnel entry with a standard six-component balance without the flow through capability. Additional wind tunnel entries are not desirable because they are expensive, time consuming, and impede the efficiency of aeroscience research.

Figure 3:
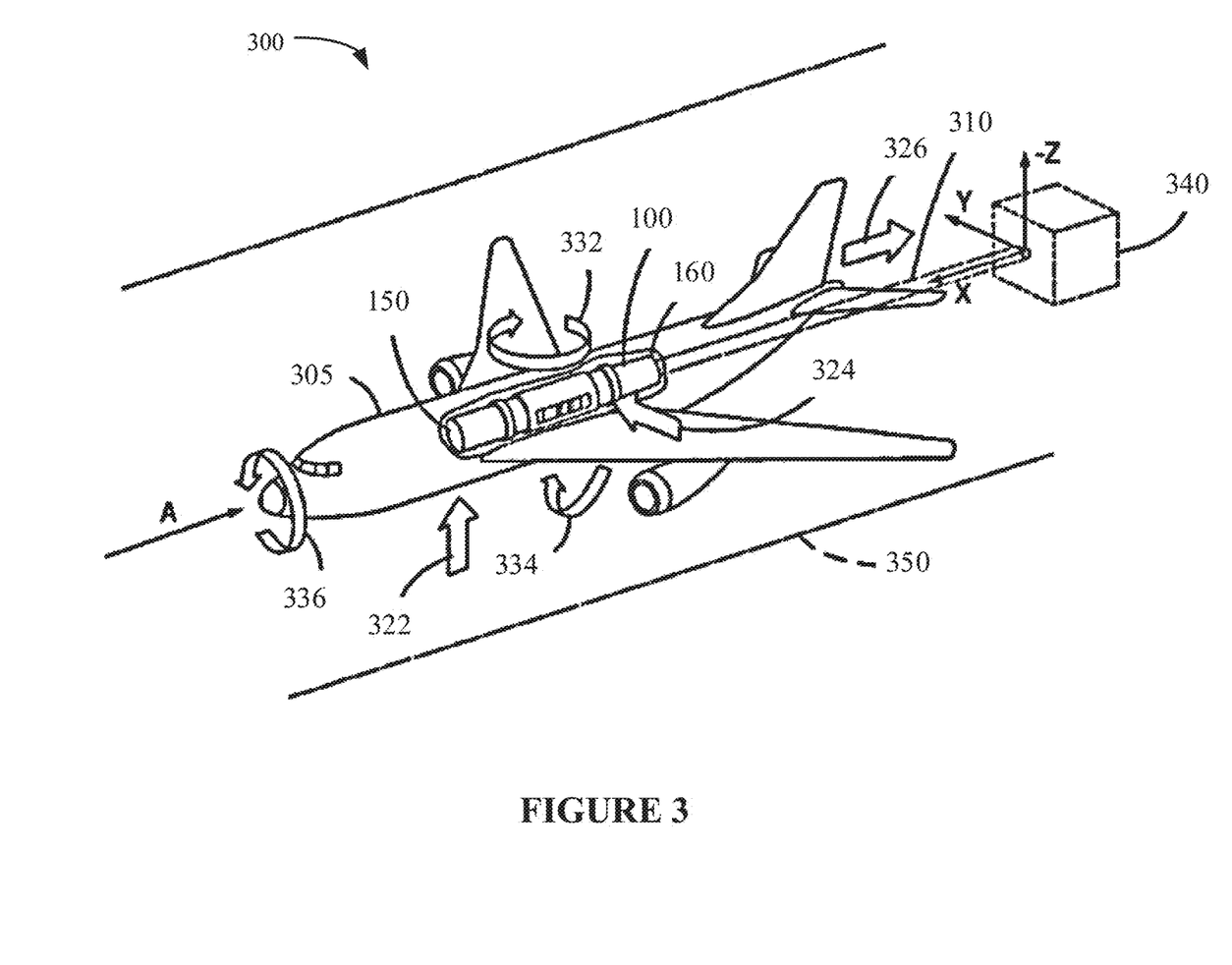
FIG. 3 is a schematic view of a test model supported by an internal force balance in a wind tunnel for testing in accordance with embodiments of the present disclosure.

To demonstrate its application within a wind tunnel, in the illustrated example of FIG. 3, the integral flow-through force transducer 100 includes the metric interface portion or end 150 end that connects to a test model 305 and the non-metric interface portion or end 160 (which may be tapered) that is attached to a support structure or sting 310 in the wind tunnel 300. The metric interface end 150 is where the aerodynamic loads are transferred into the main body of the balance 100 and the flexure beams. In addition to the force balance 100, an angle measurement system may be installed inside of the test model 305 for measuring model orientation. Together, the test model 305, model sting 310, integral flow-through force transducer 100, and instrumentation comprise an improved wind-tunnel model system.

In a typical known wind tunnel test, wind tunnel aerodynamic loads acting on model 305 include a normal (lift) force 322, a side force 324, and an axial (drag) force 326. The aerodynamic loads also include a yaw moment 332, a pitch moment 334, and a roll moment 336. The non-metric interface end 160 of the integral flow-through force transducer 100 may be rigidly interconnected to the sting 310 that comprises an elongated support structure such as a rod that is movably connected to a base 340. The elongated rod may be substantially aligned with the forces 326 acting in an axial direction. Base 340 may include powered actuators such that the elongated rod of the sting 310 may be rotated about the x, y, and z axes to change the orientation of model 305 relative to the direction of the air flow "A". The model 305, base 340, and other components may be located inside an elongated passageway 350 of the wind tunnel. The internal balance 100 is generally disposed near the center of gravity of the aircraft test model 305 and all forces detected by the balance are communicated by means of electrical wires which are routed through the elongated rod or sting 310 and through a stationary base to an information receiving computer (not shown). In a like manner, tubes for communicating fluids, such as air or gas, to the aircraft test model 305 are routed through the hollow sting 310 to an integral fluid flow path of the integral flow-through force transducer 100 and routed to the test model 305 through the axial strain measurement component 120 of the internal balance. Thus, the integral flow-through force transducer 100 is a novel six component flow-through wind tunnel balance that allows for direct measurement of aerodynamic interference forces in addition to aerodynamic forces and moments/torques while providing a continuous integral fluid passage through a multi-component force transducer that does not deteriorate measurement accuracy by introducing parasitic load paths. As such, an exemplary integral flow-through force transducer 100 provides the ability to flow or store fluid or gas through the structural components of the force transducer 100.

To better appreciate the novelty of the present disclosure, it is important to understand the difference between flow-through balances which have an integral fluid flow passage from a related technology known as flow-around balances which provide a structurally parallel flow path around an exterior shell of the balance typically using bellows, which are complex to install and maintain and can lead to hysteresis effects. Flow-around designs are typically restricted to low pressure applications in contrast to flow-through which can accommodate both high and low pressure requirements. The technology in accordance with the present disclosure eliminates bellows, which have the following undesirable characteristics: (1) unpredictable micro-scale deflection modes, (2) larger parasitic load affects with higher sensitivity to pressure, and flow (3) susceptibility to leakage at solder/brazed joints. These characteristics make for a less predictable, repeatable, and desirable transducer. Advantageously, in the designs of the present disclosure, structural tubes and flexure membranes are utilized in the forward and rear portions which provide compliance similar to bellows. Accordingly, the integral flow through balance in accordance with the present disclosure is rigid, stable, repeatable, and measurement quality is significantly less dependent on pressure and flow rate effects. As an example, FIG. 4A shows an exterior view of a bend component 400 of structural tubes 410 and flexure membranes 420 that may be utilized in the forward and rear portions of the strain measurement components 110, 130 of an embodiments of the integral flow-through force transducer 100 and to which strain gages may be affixed. Correspondingly, FIG. 4B shows a cross sectional view showing the flow path through structural tubes of the bend component 400 to which the integral fluid flow path 140 may be communicatively coupled so that the flow of gas may be directed in the direction of the illustrative arrows from one side of the component to the other side. Additionally, flow adapter inserts can be integrated into the non-metric and metric ends of the balance to minimize fluid pressure losses across the balance or can be designed as separate parts and connected to the respective ends of the balance in various embodiments.

Figure 5A:
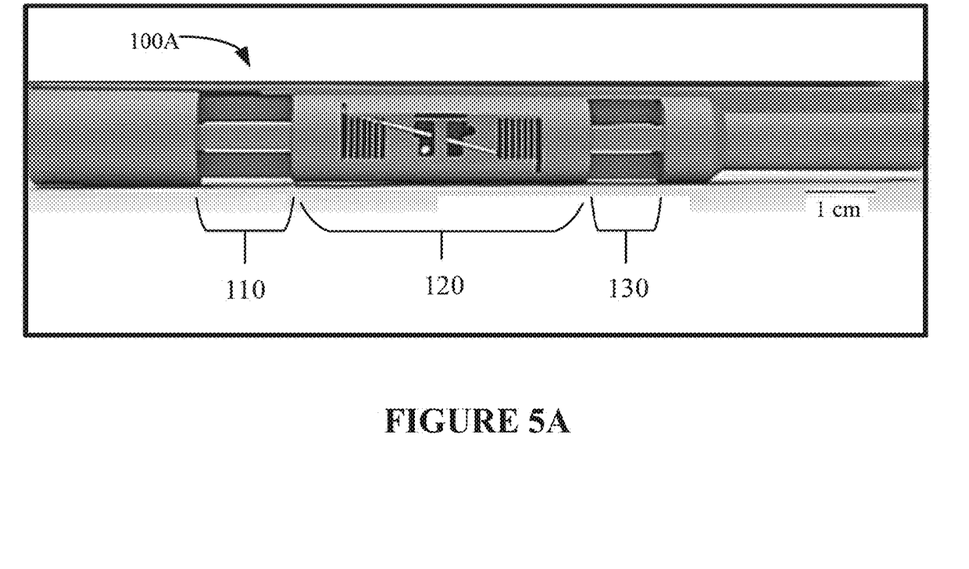
FIG. 5A is a photographic image of an exemplary integral flow-through force transducer prototype produced using additive manufacturing in accordance with embodiments of the present disclosure.
Figure 5B:
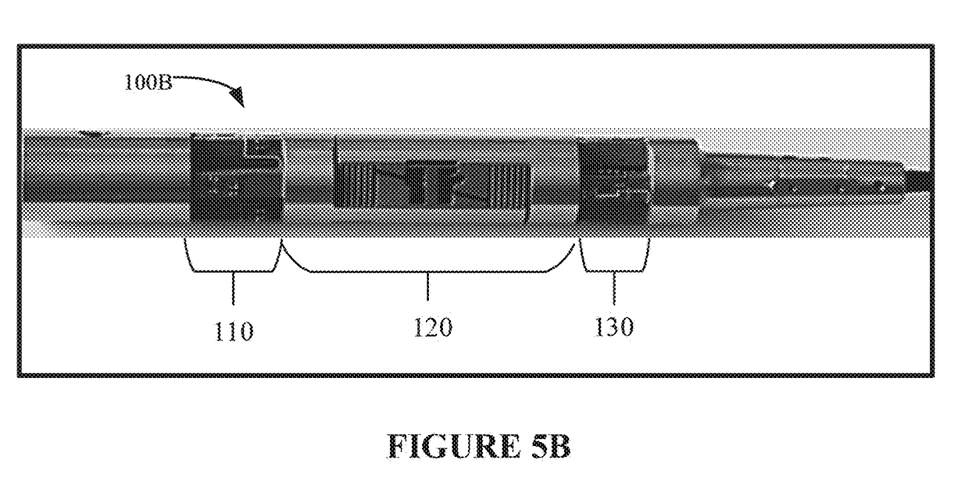
FIG. 5B is a photographic image of an exemplary integral flow-through force transducer prototype having been equipped with strain gages and related measurement instrumentations in accordance with embodiments of the present disclosure.

Although an exemplary integral flow-through force transducer can be manufactured using conventional manufacturing methods, the exemplary integral flow-through force transducer can also be manufactured using advanced manufacturing methods, such as additive manufacturing without increasing manufacturing complexity or cost. For reference purposes, FIG. 5A shows a photographic image of an exemplary integral flow-through force transducer prototype 100A produced using additive manufacturing that was printed in three days as compared to a 9-12 month production period for conventional fabrication methods. Respectively, FIG. 5B shows the exemplary integral flow-through force transducer prototype 100B after being equipped with strain gages for the forward strain measurement component 110, the axial strain measurement component 120, and the rear strain measurement component 130 and related measurement instrumentations, such as temperature and/or pressure sensors disposed in the fluid flow path 140. In turn, calibration processes and mathematical modeling can be utilized to perform uncertainty quantification of the transducer's measurement performance, such as by characterizing and compensating or variably controlling the transducer's performance as a function of applied load, fluid pressure, temperature, and fluid flow rate for momentum corrections.

A variety of applications can benefit from the systems and methods of the present disclosure directed to an integral flow-through force transducer 100. These applications include powered simulation testing, among others. In powered simulation testing, wind tunnel models require access to high pressure fluids for a variety of ground testing applications including boundary layer ingestion, retropropulsion, and active flow control testing. For the majority of these tests, it is desired to utilize a wind tunnel balance to measure global forces on the test model.

In the disclosed design, the high pressure fluid passes through the internal balance 100 to give the test model access to fluid/gas resources. For example, an exemplary integral flow-through force transducer 100 will allow for the direct measurement of powered descent aerodynamics interference forces, while no existing flow-through balances meet test requirements for testing supersonic retropropulsion (SRP) on planetary entry vehicles and generating ground test data for SRP with subscale models and inert gas stimulant(s). For example, current testing often utilizes pressure-sensitive paint (PSP) to acquire force information but PSP cannot be simultaneously used with off-body flow visualization techniques. The capability to perform direct force measurements will enable for critical data to be provided for computational fluid dynamics (CFD) validation and for aerodynamic loads to be directly measured on the model separate from thrust, thereby allowing for simultaneous off-body, quantitative flow visualization.

Additionally, another application for the integral flow-through force transducer 100 involves extreme thermal environments, where temperature gradients and elevated temperatures are a detriment for force transducers and thus, the thermal conditioning of an internal balance is necessary to improve measurement accuracy and to protect thermally sensitive components. In the disclosed design, by routing fluid pathways through structural, flexural elements from one end of the transducer 100 to the other, thermal gradients within the integral flow-through force transducer 100 can be eliminated or reduced and used to cool the transducer to prevent overheating. Further, in various embodiments, active thermal conditioning can be accomplished by controllably varying the fluid temperature and flow rate that is being passed through the transducer 100 in either an open-circuit or recirculating gas arrangement.

Next, in systems requiring tuning or active control of the static and/or dynamic structural response, the disclosed design allows for a variable viscosity or modulus controlled fluid to be stored within the transducer structure. Accordingly, the disclosed concept enables a new class of force transducers that can measure forces over different ranges based on the modulus of the fluid stored inside the transducer 100. This effect could also be used to detune the structure away from a resonant condition encountered during aerodynamic testing and thus provide active damping characteristics, which can be particularly beneficial with the undesirable unsteady forces in wind tunnel testing.

Accordingly, access to high pressure fluid through an internal balance has broader application than simply wind tunnel testing. For example, filling the fluid flow pathways of the integral flow-through force transducer 100 with variable viscosity or modulus controlled fluid to vary the stiffness and/or damping properties of the transducer 100 can be of beneficial use in dynamic environments. Also, with the aforementioned applications involving temperature gradients and/or elevated temperatures, this technology can be vital to manufacturers of industrial force transducers, which includes the oil and gas industry, industrial settings, automobiles, aeronautics, and space. One specific automotive example includes the use of exemplary integral flow-through force transducers to measure the forces exerted on engine cylinder blocks and exhaust manifolds during vehicle operation. As another example, integral flow-through force transducers may be used in the balancing of drills for oil and gas applications to detune unwanted system dynamics. Further, potential usage areas within biology/medicine include biological dosing where a fluid flows through a force-sensitive delivery device as well haptic feedback systems used in robotic surgical systems. Industrial applications may include robots where force feedback is used to deliver an aerosol spray, liquid, or gas, among others.

It should be emphasized that the above-described embodiments are merely possible examples of implementations, merely set forth for a clear understanding of the principles of the present disclosure. Many variations and modifications may be made to the above-described embodiments without departing substantially from the spirit and principles of the present disclosure. All such modifications and variations are intended to be included herein within the scope of this disclosure and protected by the following claims.

What is claimed is:

1. An internal force transducer balance system comprising:
    an internal balance configured for placement within a wind tunnel having a balance body extending axially along a longitudinal direction, the balance body having a metric interface portion at a first end and a non-metric interface portion at a second end of the balance body, the balance body further including an axial strain measurement component of the balance body, wherein the axial strain measurement component is configured to measure an axial force applied to the internal balance; and
    an integral fluid flow path that continuously extends from the first end to the second end of the balance body, wherein the integral fluid flow path is positioned in an interior core of the balance body and is routed through the axial strain measurement component of the internal balance,
    wherein the integral fluid flow path comprises one or more turns as the integral fluid flow path is routed through the axial strain measurement component of the internal balance.

2. The system of claim 1, wherein the balance body further includes a strain measurement component disposed between the axial strain measurement component and the metric interface portion of the balance body, wherein the strain measurement component is configured to measure one or more forces and moments applied to the internal balance in an orthogonal direction relative to a longitudinal axis of the internal balance.

3. The system of claim 1, wherein the balance body of the internal balance further includes a strain measurement component disposed between the axial strain measurement component and the non-metric interface portion of the balance body, wherein the strain measurement component is configured to measure one or more forces and moments applied to the internal balance in an orthogonal direction relative to the longitudinal axis of the internal balance.

4. The system of claim 1, wherein the balance body further includes a forward strain measurement component disposed between the axial strain measurement component and the metric interface portion of the balance body and a rear strain measurement component disposed between the axial strain measurement component and the non-metric interface portion of the balance body, wherein the forward and rear strain measurement components are configured to measure one or more forces and moments applied to the internal balance in an orthogonal direction relative to the longitudinal axis of the internal balance.

5. The system of claim 4, wherein the internal balance is configured to directly measure six components of aerodynamic forces and moments applied to the internal balance and to measure aerodynamic interference forces applied to the internal balance as fluid flows through the integral fluid flow path of the internal balance.

6. The system of claim 4, wherein the forward strain measurement component and the rear strain measurement component each comprise a plurality of structural tubes and a flexure membrane, wherein the plurality of structural tubes is coupled to the integral fluid flow path of the internal balance.

7. The system of claim 1, further comprising:
    a test model configured to be connected to the metric interface portion of the internal balance, wherein the integral fluid flow path of the internal balance is coupled to an internal fluid flow path of the test model.

8. The system of claim 7, further comprising:
    wind tunnel testing equipment having a sting element, wherein the sting element is connected to the non-metric interface portion of the internal balance, wherein the integral fluid flow path of the internal balance is coupled to an internal fluid flow path of the sting element.

9. The system of claim 8, wherein the internal balance is configured to receive fluid from the sting element and route the fluid to the test model.

10. The system of claim 9, wherein the internal balance is configured to measure three components of force and three moments applied to the internal balance.

11. The system of claim 10, wherein the force is due to fluid flowing through the internal balance, wherein the fluid comprises pressurized air or gas.

12. An internal balance measurement method comprising:
    providing an internal balance for a wind tunnel having a balance body extending axially along a longitudinal direction, the balance body having a metric interface portion at a first end and a non-metric interface portion at a second end of the balance body, the balance body further comprising an axial strain measurement component of the balance body, wherein the axial strain measurement component is configured to measure an axial force applied to the internal balance, the balance body further comprising an integral fluid flow path that continuously extends from the first end to the second end of the balance body, wherein the integral fluid flow path is positioned in an interior core of the balance body and is routed through the axial strain measurement component of the internal balance, wherein the integral fluid flow path comprises one or more turns as the integral fluid flow path is routed through the axial strain measurement component of the internal balance;

connecting the metric interface portion of the internal balance to a test model, wherein the integral fluid flow path of the internal balance is coupled to an internal fluid flow path of the test model;

connecting the non-metric interface portion of the internal balance to a sting element of a wind tunnel testing equipment, wherein the integral fluid flow path of the internal balance is coupled to an internal fluid flow path of the sting element;

applying air flow over the test model while a fluid is applied to the integral fluid flow path via the sting element; and measuring, via the axial strain measurement component, an axial force applied to the internal balance by the air flow over the test model and the fluid applied to the integral fluid flow path.

13. The method of claim 12, wherein:

the balance body of the internal balance comprises a forward strain measurement component disposed between the axial strain measurement component and the metric interface portion of the balance body;

the balance body of the internal balance further comprises a rear strain measurement component disposed between the axial strain measurement component and the non-metric interface portion of the balance body; and the forward strain measurement component and the rear strain measurement component are configured to measure one or more forces and moments applied to the internal balance in an orthogonal direction relative to the longitudinal axis of the internal balance.

14. The method of claim 13, further comprising:

directly measuring three components of force and three moments applied to the internal balance.

15. The method of claim 14, wherein the force is due to fluid flowing through the internal balance, wherein the fluid comprises pressurized air or gas.

16. The method of claim 12, further comprising:

controlling a temperature or a flow rate of the fluid to reduce thermal gradients within the internal balance.

17. The method of claim 16, wherein both the temperature and the flow rate are controlled to reduce thermal gradients within the internal balance.

18. The method of claim 12, further comprising:

performing powered simulation testing on the test model using direct measurements obtained from the internal balance.

19. The method of claim 12, wherein the test model comprises a planetary entry vehicle test model, the method further comprising:

testing supersonic retropropulsion on the planetary entry vehicle test model using direct measurements obtained from the internal balance.

20. The method of claim 12, wherein a viscosity or modulus of the fluid is controllably modified during application of the fluid to the integral fluid flow path.

* * * * *